United States Patent [19]

Clarke et al.

[11] 4,306,891
[45] Dec. 22, 1981

[54] SEPARATOR FOR PRECIPITATING PARTICULATE FROM AN AIRFLOW

[75] Inventors: Ralph H. Clarke; Wesley J. Clarke; Steven L. Mays, all of Eugene, Oreg.

[73] Assignee: Clarke's Sheet Metal, Inc., Eugene, Oreg.

[21] Appl. No.: 131,382

[22] Filed: Mar. 17, 1980

[51] Int. Cl.³ ............................................. B01D 41/00
[52] U.S. Cl. ........................................ 55/274; 55/465; 55/344; 209/139 R; 209/154
[58] Field of Search ................... 55/461–465, 55/274, 315, 342, 344, 1, 418, 422; 209/134–137, 139 R, 154; 406/168–174; 49/323, 363; 52/64, 109; 251/219, 319, 121; 138/46

[56] References Cited

U.S. PATENT DOCUMENTS

| 512,873 | 1/1894 | Finley | 406/168 |
|---|---|---|---|
| 1,019,350 | 3/1912 | Packard | 55/464 |
| 1,211,310 | 1/1917 | Griffin | 55/465 |
| 1,742,812 | 1/1930 | Honeycutt | 209/135 |
| 1,821,860 | 9/1931 | Werner et al. | 55/422 |
| 1,924,125 | 8/1933 | Linderman | 138/46 |
| 2,244,372 | 6/1941 | Pomeroy | 55/418 |
| 3,236,028 | 2/1966 | Rutan | 55/189 |
| 3,476,439 | 11/1965 | Homan | 406/171 |
| 3,884,528 | 5/1975 | Shaddock | 406/171 |
| 4,010,096 | 3/1977 | Murray et al. | 209/154 |
| 4,229,189 | 10/1980 | Pircon | 55/90 |

FOREIGN PATENT DOCUMENTS 4362 of 1878 United Kingdom .................. 55/315

Primary Examiner—Bernard Nozick
Attorney, Agent, or Firm—James D. Givnan, Jr.

[57] ABSTRACT

A separator for a pneumatic conveyor system having fixed wall and a movable wall jointly defining a chamber of greater crossection than a conduit supplying a particulate carrying airflow. An inlet discharges the airflow into the chamber and into impingement with the movable wall to initiate particle separation.

5 Claims, 2 Drawing Figures

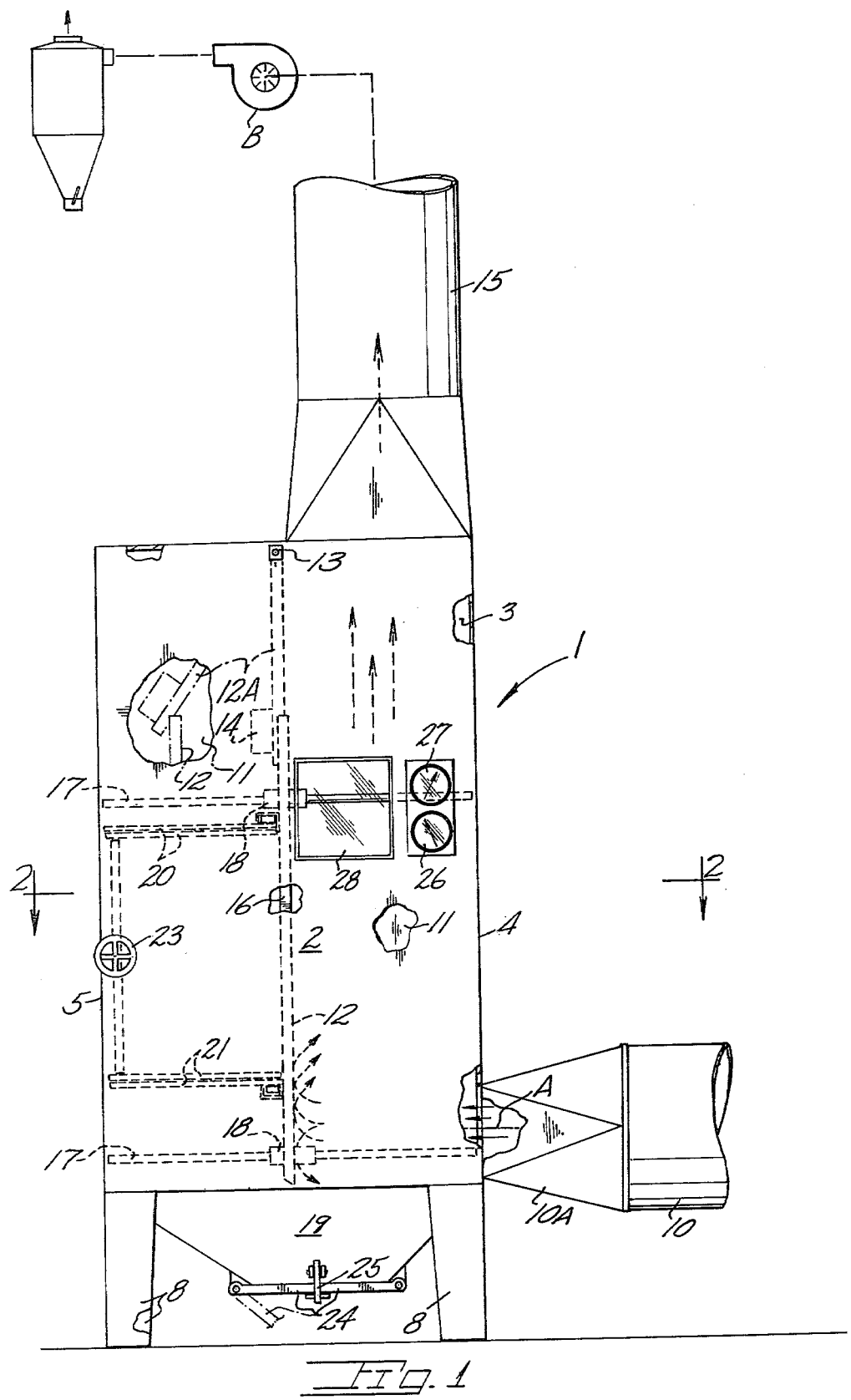

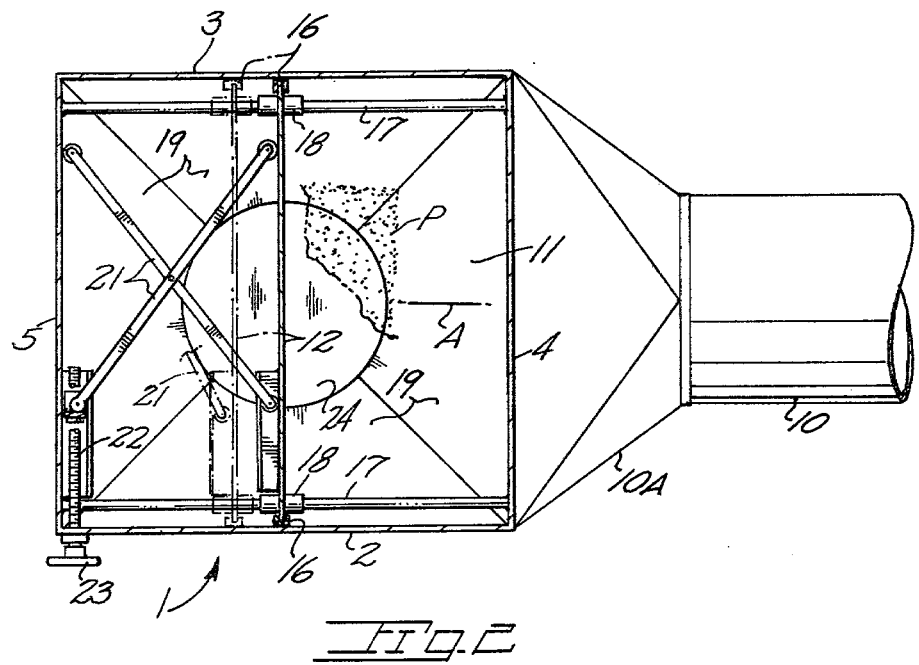

4,306,891

SEPARATOR FOR PRECIPITATING PARTICULATE FROM AN AIRFLOW

BACKGROUND OF THE INVENTION

The present invention relates generally to a separator for removing particulate from an airflow carrying particles of different densities and more specifically to a separator accomplishing separation by a sudden change in airflow velocity and thereafter an upward, slowed flow through an enlarged separator chamber.

In the manufacture of various wood products such as plywood, dimensioned lumber, etc., the products are subjected to sanding or the like to provide the desired surface thereon. Provision is normally made in the manufacturing facility for the automatic and continuous removal of the resulting sander dust and other residue from such operations. Commonly, pneumatic conveyor systems are used to transfer the dust and other particulate to a remote collection point.

In the interest of better utilization of wood resources, such dust is commonly reclaimed and used as a constituent of other manufactured wood products. Undesirably, some abrasive particles such as those dislodged from a sander belt also become mixed with the dust and become part of the later manufactured wood product. Subsequently, the amount of abradant particles in the manufactured wood product constitutes a significant factor in the wear of machinery and tools performing various operations on the wood product.

The minute, abrasive particles have a cumulative effect on saws, planer, sanders, etc., with resulting excessive wear and replacement of such equipment adding to product manufacturing costs over a period of time.

Also undesired in the reclaimed wood material are oversize wood particles or rejects which alter the desired homogenous constituency of the finished product.

SUMMARY OF THE PRESENT INVENTION

The present invention is embodied in a separator for use in a pneumatic conveyor system for removing particles, such as abradants or oversize wood particle rejects from an airstream carrying particles of different densities and/or aerodynamic characteristics.

A walled structure includes fixed walls with which a movable wall member jointly defines a variable size chamber into which an airflow is discharged. The chamber is of greater crossectional area than a communicating inlet duct. Impingement of the airflow against the chamber structure and reduced airflow velocity in the structure may be regulated so as to affect the precipitation of heavier particles, such as abradants or oversize wood particle rejects for collection within a hopper or the like. The movable wall member is positionable by adjustment means which may be a scissor linkage. An outlet duct receives chamber airflow for routing to additional particle collection means.

Important objects of the present separator include the provision of a separator and method for removing the heavier particles from a conveyor airflow without impeding same by momentarily subjecting the airflow to a rapid velocity drop and a slowed upright flow; the provision of a separator having movable wall means which is positionable relative the fixed walls of the separator structure to define a chamber the crossectional area of which may be varied to alter airflow velocity and hence particle precipitation therein; and, the provision of movable wall means within a particle separator said means being transversely disposed to the axis of an incoming airflow.

BRIEF DESCRIPTION OF THE DRAWINGS

In the accompanying drawings:

FIG. 1 is a side elevational view of the present separator; and

FIG. 2 is a horizontal sectional view taken downwardly along line 2—2 of FIG. 1.

DETAILED DESCRIPTION OF THE PREFERRED EMBODIMENT

With continuing attention to the drawings, the reference numeral 1 indicates generally a box-like fixed walled structure including walls 2, 3, 4 and 5 joined at their common edges. Corner mounted legs are at 8. The lower end of walled structure 1 is closed by a later described collector.

An inlet 10 normally carries a sub-atmospheric pressure airflow as, for example, induced by a blower B (shown schematically) both of which may be part of a pneumatic conveyor system. Such conveyor systems are used to collect and convey various mixed types of particulate which, in a wood products manufacturing plant, primarily consists of fine wood dust. Conveyed along with the dust, as earlier noted are dislodged abrading particles usually of a mineral nature and of heavier density than the wood dust.

Inlet means 10 discharges the airflow so as to move along a projected axis A into a chamber 11 and impinge against movable wall means at 12. A flared duct segment 10A disperses the airflow across the width of the movable wall means. Said wall means desirably includes an inclined segment at 12A swingably mounted at 13 and weighted at 14 for rested, sealing engagement with wall means 12. Along the side edges of wall means 12 are neoprene seals as at 16.

Outlet means at 15 receives an upward airflow from the upper portion of chamber 11 and may direct same to blower B and to a second particle separator such as one of the cyclone type as shown schematically, a filter collector device or another one of the present type separator.

With attention again to movable wall means 12, the same is positionable in a substantially parallel manner relative to opposite separator wall 4 to enable varying of the crossectional area of chamber 11.

Upper and lower pairs of guide bars at 17 slidably support guides 18, the latter integral with wall means 12 to enable forward advancement of same toward wall 4 or, conversely, rearward retraction toward the left hand side of the separator as shown in FIG. 1.

Adjustment means acts on wall means 12 and may be, for example, of the scissors type including upper and lower pairs of scissor linkages at 20 and 21 controlled by a screwshaft 22 and an operator actuated hand wheel 23.

Disposed below upright chamber 11 is a collector 19 which is embodied in a hopper type structure having inclined walls defining a discharge opening at their lower extremities, said opening normally closed by movably mounted plates 24 which permit periodic emptying of the collector. A latch mechanism 25 retains the plates in upward abutment with the hopper walls. Obviously, other types of collector arrangement may be utilized to receive precipitated particulate P from chamber 11.

In operation, the sub-atmospheric airflow within duct 10 is discharged into the lower portion of chamber 11 so as to impinge against and across movable wall means 12 resulting in a turbulent area within the lower portion of the chamber. The axis A of the inlet airflow is substantially normal or perpendicular to wall means 12 resulting in wall impingement of the airflow and some particle separation from the airflow. Subsequent passage of the airflow is upwardly through chamber 11 at a reduced velocity (relative to duct velocity) during which passage particle precipitation occurs with higher density particles gravitating into the collector. Positioning of wall member 12 so as to decrease the crossectional area of chamber 11 will increase chamber velocity resulting in less particle precipitation. To enable precise control of chamber velocity, pressure gauges at 26-27 read respectively duct and chamber pressures while a window at 28 provides for operator surveillance of separator operation and wall member positioning.

In one embodiment, wall means 12 when positioned to effect a crossectional area of chamber 11 somewhat greater than twice the like dimension of inlet duct 10 provides a suitable reduction in the chamber airflow for particle precipitation. The area ratio between chamber 11 and inlet duct 10 will be determined primarily according to the CFM flow of the conveyor system and the nature of the particles to be separated.

While we have shown but one embodiment of the invention it will be apparent to those skilled in the art that the invention may be embodied still otherwise without departing from the spirit and scope of the invention.

Having thus described the invention, what is desired to be secured under a Letters Patent is:

We claim:

1. A separator for the removal of particulate from an airflow carrying different density particles, said separator comprising, fixed wall structure including contiguous walls partially defining an upright chamber through which the airflow passes, airflow inlet and outlet means in direct communication with said chamber, means inducing an airflow through said inlet and outlet means and said chamber, collector means disposed below said fixed wall structure, movable wall means disposed upright within said fixed wall structure and additionally defining said chamber, said movable wall means at all times offset from and extending substantially parallel to an opposed wall of the fixed wall structure, said inlet means being an air duct located normal to and offset from said movable wall means and discharging the airflow in a direction so as to cause impingement of the airflow against said wall means to initiate particle separation from the airflow, and adjustable means coupled to said wall means enabling positioning and retaining same relative the oppositely disposed wall so as to permit altering the crossectional area of said chamber and hence the velocity of the airflow passing upwardly therethrough to thereby control the precipitation of heavier density particulate from the chamber airflow.

2. The separator claimed in claim 1 wherein said inlet and said outlet means convey airflows moving along perpendicularly oriented vectors.

3. The separator claimed in claim 1 additionally including pressure gauges in communication with the interior of a duct and with said chamber and indicating a pressure differential during separator operation.

4. The separator claimed in claim 1 wherein the movable wall means includes a swingable inclined segment terminating upwardly at said airflow outlet means.

5. The separator claimed in claim 8 wherein said movable wall means includes seals coacting with the fixed wall structure.

* * * * *